United States Patent
Niblock et al.

(10) Patent No.: US 9,278,462 B2
(45) Date of Patent: Mar. 8, 2016

(54) BACKSTRIKE PROTECTION DURING MACHINING OF COOLING FEATURES

(71) Applicant: General Electric Company, Schenectady, NY (US)

(72) Inventors: Robert R. Niblock, Maple Valley, WA (US); Paul H. Tacheron, Auburn, WA (US); Steven J. Craigen, Auburn, WA (US); Mohamed A. Hashish, Bellevue, WA (US); Ronald Scott Bunker, West Chester, OH (US); Andrew Lee Trimmer, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 213 days.

(21) Appl. No.: 14/084,655

(22) Filed: Nov. 20, 2013

(65) Prior Publication Data

US 2015/0135512 A1    May 21, 2015

(51) Int. Cl.
*B26F 1/26* (2006.01)
*B23P 15/02* (2006.01)
*F01D 5/18* (2006.01)
(Continued)

(52) U.S. Cl.
CPC . *B26F 1/26* (2013.01); *B23K 26/00* (2013.01); *B24C 1/045* (2013.01); *F01D 5/18* (2013.01); *B23P 15/02* (2013.01); *B23P 2700/06* (2013.01); *F01D 5/181* (2013.01); *Y10T 29/49341* (2015.01); *Y10T 29/49885* (2015.01); *Y10T 29/49982* (2015.01); *Y10T 29/49986* (2015.01); *Y10T 29/49995* (2015.01)

(58) Field of Classification Search
CPC ................... Y10T 29/49341; Y10T 29/49339;
Y10T 29/49885; F01D 5/18; F01D 5/181;
B23P 15/02; B23P 2700/06; B26F 1/26;
B26F 3/008
See application file for complete search history.

(56) References Cited

U.S. PATENT DOCUMENTS 3,730,040 A    5/1973  Chadwick et al.
4,487,550 A   12/1984  Horvath et al.
(Continued)

FOREIGN PATENT DOCUMENTS

EP    1387040 B1    4/2004
EP    1557240 A1    7/2005
(Continued)

OTHER PUBLICATIONS

Hyams et al., "A Detailed Analysis of film Cooling Physics: Part III—Streamwise Injection With Shaped Holes," Journal of Turbomachinery, vol. 122, Issue 1, Jan. 2000, pp. 122-132.
(Continued)

*Primary Examiner* — Jermie Cozart
(74) *Attorney, Agent, or Firm* — Ann M. Agosti

(57) ABSTRACT

A method of machining a component including a substrate having an outer surface and an inner surface defining at least one interior space includes: disposing a distributed medium having a plurality of irregularly shaped particles in the interior space and forming at least one hole in the substrate, while the distributed medium is disposed within the interior space, such that the distributed medium provides backstrike protection for an opposing wall during the formation of the hole(s). Each hole extends through the substrate to provide fluid communication with the respective interior space; and the method further includes removing the distributed medium from the interior space.

19 Claims, 5 Drawing Sheets

(51) Int. Cl.
B23K 26/00 (2014.01)
B24C 1/04 (2006.01)

(56) References Cited

U.S. PATENT DOCUMENTS

| | | | |
|---|---|---|---|
| 4,669,229 A | 6/1987 | Ehlbeck | |
| 4,864,780 A | 9/1989 | Ehlbeck et al. | |
| 4,893,987 A | 1/1990 | Lee et al. | |
| 5,227,098 A | 7/1993 | Philby et al. | |
| 5,564,902 A | 10/1996 | Tomita | |
| 5,626,462 A | 5/1997 | Jackson et al. | |
| 5,640,767 A | 6/1997 | Jackson et al. | |
| 5,660,523 A | 8/1997 | Lee | |
| 5,875,549 A | 3/1999 | McKinley | |
| 6,059,530 A | 5/2000 | Lee | |
| 6,086,328 A | 7/2000 | Lee | |
| 6,164,914 A | 12/2000 | Correia et al. | |
| 6,190,129 B1 | 2/2001 | Mayer et al. | |
| 6,214,248 B1 | 4/2001 | Browning et al. | |
| 6,231,307 B1 | 5/2001 | Correia | |
| 6,234,755 B1 | 5/2001 | Bunker et al. | |
| 6,321,449 B2 | 11/2001 | Zhao et al. | |
| 6,368,060 B1 | 4/2002 | Fehrenbach et al. | |
| 6,383,602 B1 | 5/2002 | Fric et al. | |
| 6,405,435 B1 | 6/2002 | Konter et al. | |
| 6,412,541 B2 | 7/2002 | Roesler et al. | |
| 6,427,327 B1 | 8/2002 | Bunker | |
| 6,547,645 B2 | 4/2003 | Devine, II | |
| 6,551,061 B2 | 4/2003 | Darolia et al. | |
| 6,582,194 B1 | 6/2003 | Birkner et al. | |
| 6,602,053 B2 | 8/2003 | Subramanian et al. | |
| 6,617,003 B1 | 9/2003 | Lee et al. | |
| 6,905,302 B2 | 6/2005 | Lee et al. | |
| 6,921,014 B2 | 7/2005 | Hasz et al. | |
| 7,014,923 B2 | 3/2006 | Schnell et al. | |
| 7,094,475 B2 | 8/2006 | Schnell et al. | |
| 7,186,167 B2 | 3/2007 | Joslin | |
| 7,216,428 B2 | 5/2007 | Memmen et al. | |
| 7,302,990 B2 | 12/2007 | Bunker et al. | |
| 7,628,678 B2 | 12/2009 | Moser et al. | |
| 7,744,348 B2 | 6/2010 | Bezencon et al. | |
| 7,766,617 B1 | 8/2010 | Liang | |
| 7,775,768 B2 | 8/2010 | Devore et al. | |
| 8,147,196 B2 | 4/2012 | Campbell et al. | |
| 8,235,772 B2 | 8/2012 | Moser et al. | |
| 8,380,338 B2 | 2/2013 | Miller et al. | |
| 8,387,245 B2 | 3/2013 | Bunker et al. | |
| 2002/0141868 A1 | 10/2002 | Lee et al. | |
| 2002/0141869 A1 | 10/2002 | Lee et al. | |
| 2002/0182074 A1 | 12/2002 | Bunker | |
| 2002/0197160 A1 | 12/2002 | Liang | |
| 2003/0040262 A1* | 2/2003 | Devine, II | 451/40 |
| 2003/0118444 A1 | 6/2003 | Lee et al. | |
| 2004/0023596 A1 | 2/2004 | Devine, II | |
| 2004/0064930 A1* | 4/2004 | Gunn et al. | 29/421.1 |
| 2004/0096328 A1 | 5/2004 | Soechting et al. | |
| 2006/0153680 A1 | 7/2006 | Liang | |
| 2010/0080688 A1 | 4/2010 | Bezencon et al. | |
| 2011/0076405 A1 | 3/2011 | Raji et al. | |
| 2013/0056143 A1* | 3/2013 | Cuttell | 156/250 |
| 2013/0056184 A1 | 3/2013 | Bunker et al. | |
| 2013/0139990 A1 | 6/2013 | Appleby et al. | |
| 2013/0140007 A1 | 6/2013 | Bunker et al. | |

FOREIGN PATENT DOCUMENTS

| | | | |
|---|---|---|---|
| FR | 2699850 A1 | 7/1994 | |
| JP | 2001349201 A | * 12/2001 | |
| JP | 2003343205 A | * 12/2003 | |

OTHER PUBLICATIONS

Wei et al., "Curved Electrode and Electrochemical Machining Method and Assembly Employing the Same," U.S. Appl. No. 12/562,528, filed Sep. 18, 2009.

Zhang et al., Process and System for Forming Shaped Air Holes, U.S. Appl. No. 12/697,005, filed Jan. 29, 2010.
Lacy et al., "Hot Gas Path Component Cooling System," U.S. Appl. No. 12/765,372, filed Apr. 22, 2010.
Lacy et a., "Articles Which Include Chevron Film Cooling Holes, and Related Processes," U.S. Appl. No. 12/790,675, filed May 28, 2010.
Lambie et al., "An Overview on Micro-Meso Manufacturing Techniques for Micro-Heat Exchangers for Turbine Blade Cooling," International Journal Manufacturing Research, vol. 3, No. 1, 2008, pp. 3-26.
Bunker et al., "Components With Re-Entrant Shaped Cooling Channels and Methods of Manufacture," U.S. Appl. No. 12/943,624, filed Nov. 10, 2010.
Bunker et al., "Component and Methods of Fabricating and Coating a Component," U.S. Appl. No. 12/943,646, filed Nov. 10, 2010.
Bunker et al., "Method of Fabricating a Component Using a Fugitive Coating," U.S. Appl. No. 12/943,563, filed Nov. 10, 2010.
Bunker et al., "Components With Cooling Channels and Methods of Manufacture," U.S. Appl. No. 12/965,083, filed Dec. 10, 2010.
Bunker et al., "Method of Fabricating a Component Using a Two-Layer Structural Coating," U.S. Appl. No. 12/996,101, filed Dec. 13, 2010.
Bunker et al., "Turbine Components With Cooling Features and Methods of Manufacturing the Same," U.S. Appl. No. 12/953,177, filed Nov. 23, 2010.
Bunker, "Components With Cooling Channels and Methods of Manufacture," U.S. Appl. No. 13/026,595, filed Feb. 14, 2011.
Rebak et al., "Methods of Fabricating a Coated Component Using Multiple Types of Fillers," U.S. Appl. No. 13/083,701, filed Apr. 11, 2011.
Bunker et al., "Components With Cooling Channels Formed in Coating and Methods of Manufacture", U.S. Appl. No. 13/052,415, filed Mar. 21, 2011.
Rebak et al., "Component and Methods of Fabricating a Coated Component Using Multiple Types of Fillers," U.S. Appl. No. 13/095,129, filed Apr. 27, 2011.
Bunker, "Components With Cooling Channels and Methods of Manufacture", U.S. Appl. No. 13/168,144, filed Jun. 24, 2011.
Bunker et al., "Components With Cooling Channels and Methods of Manufacture", U.S. Appl. No. 13/210,697, filed Aug. 16, 2011.
Bunker, "Repair Methods for Cooled Components", U.S. Appl. No. 13/267,617, filed Oct. 6, 2011.
Bunker et al., Components With Laser Cladding and Methods of Manufacture, U.S. Appl. No. 13/278,816, filed Oct. 21, 2011.
Bunker, "Components With Microchannel Cooling", U.S. Appl. No. 13/326,540, filed Dec. 15, 2011.
Bunker, "Components With Microchannel Cooling", U.S. Appl. No. 13/448,469, filed Apr. 17, 2012.
Bunker, "Components With Microchannel Cooled Platforms and Fillets and Methods of Manufacture", U.S. Appl. No. 13/478,517, filed May 23, 2012.
Bunker, "Components With Cooling Channels and Methods of Manufacture", U.S. Appl. No. 13/595,120, filed Aug. 27, 2012.
Bancheri et al., "Method for Removal of Cores From Niobium-Based Part", U.S. Appl. No. 11/276,002, filed Feb. 9, 2006.
Bonini et al., "Methods of Forming Cooling Channels Using Backstrike Protection", U.S. Appl. No. 13/628,204, filed Sep. 27, 2012.
Butler et al., "Components With Asymmetric Cooling Channels and Methods of Manufacture", U.S. Appl. No. 13/664,458, filed Oct. 31, 2012.
Bunker et al., "Components With Re-Entrant Shaped Cooling Channels and Methods of Manufacture", U.S. Appl. No. 13/669,922, filed Nov. 6, 2012.
Vries et al.,"Automated abrasive water jet pin cutting system", Applied Robotics for the Power Industry (CARPI), 2010 1st International Conference on, Oct. 5-7, 2010, pp. 01-05,Montreal, Canada.
Vries et al.,"Automated abrasive water jet pin cutting system—Mark II", Applied Robotics for the Power Industry (CARPI), 2010 1st International Conference on, Sep. 11-13, 2012, pp. 28-32, Zurich, Switzerland.

* cited by examiner

BACKSTRIKE PROTECTION DURING MACHINING OF COOLING FEATURES

BACKGROUND

The invention relates generally to gas turbine engines, and, more specifically, to forming holes in gas turbine engine components.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve an acceptably long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined and suitably cooled.

In all of these exemplary gas turbine engine components, thin walls of high strength superalloy metals are typically used to reduce component weight and minimize the need for cooling thereof. Various cooling circuits and features are tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and any associated coatings. Holes may be formed to access internal regions within the component.

For many newer hot gas path components, it may be desirable to form cooling holes after a coating has been deposited. If the coating is a ceramic, this basically eliminates using electric discharge machining (EDM) and similar machining techniques, as the ceramics typically are not electrically conductive. So for these applications, it would be desirable to use laser or abrasive liquid jet (ALJ) drilling to form the cooling holes. However, backstrike can be an issue with both of these techniques. For example, FIG. 5 of the present application illustrates a problem associated with forming the holes using ALJ. Namely, when ALJ drilling is used to make coolant supply holes into the interior cavities 114, once the ALJ punches through the substrate wall and defines the hole, the ALJ can also strike the interior surface of the opposite wall, thereby damaging that surface. Similar damage can occur with laser drilling.

It would therefore be desirable to provide backstrike protection to form cooling holes using laser or ALJ drilling.

BRIEF DESCRIPTION

One aspect of the present invention resides in a method of machining a component comprising a substrate having an outer surface and an inner surface defining at least one interior space. The method comprises: disposing a distributed medium comprising a plurality of irregularly shaped particles in the interior space and forming at least one hole in the substrate, while the distributed medium is disposed within the interior space, such that the distributed medium provides backstrike protection for an opposing wall during the formation of the hole(s). Each hole extends through the substrate to provide fluid communication with the respective interior space; and the method further comprises removing the distributed medium from the interior space.

Another aspect of the present invention resides in a method of machining a component comprising a substrate having an outer surface and an inner surface defining at least one interior space. The method comprises disposing a distributed medium comprising a plurality of irregularly shaped particles in the interior space, wherein the irregularly shaped particles have a compaction ratio in a range of about sixty percent to about eighty percent. The method additionally comprises using an abrasive liquid jet to form at least one hole in the substrate, while the distributed medium is disposed within the interior space, such that the distributed medium provides backstrike protection for an opposing wall during the formation of the hole(s), wherein each hole extends through the substrate to provide fluid communication with the respective interior space; and. The method further comprises removing the distributed medium from the interior space.

DRAWINGS

These and other features, aspects, and advantages of the present invention will become better understood when the following detailed description is read with reference to the accompanying drawings in which like characters represent like parts throughout the drawings, wherein.

Figure 7:
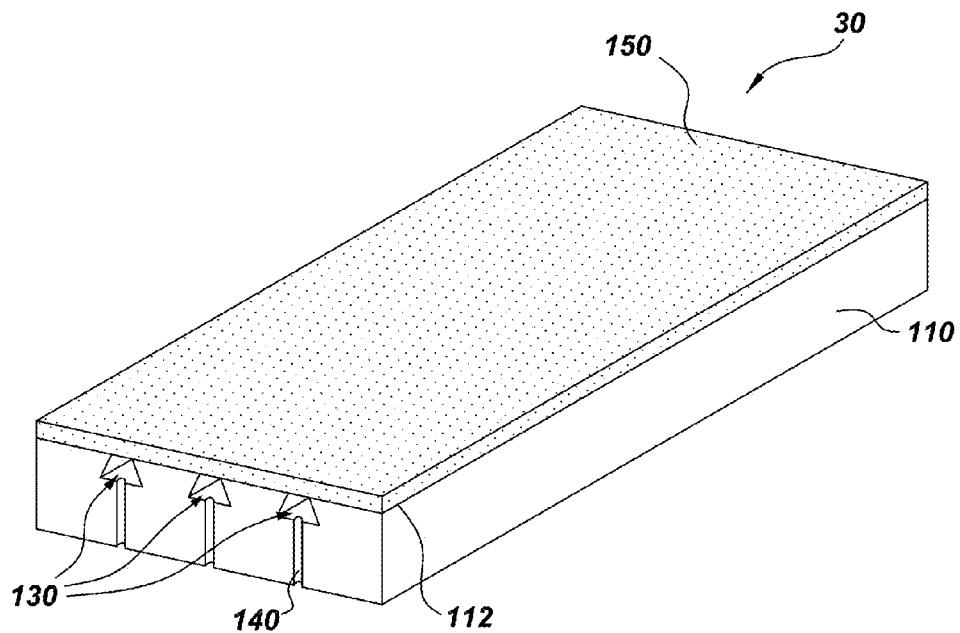
Figure 8:
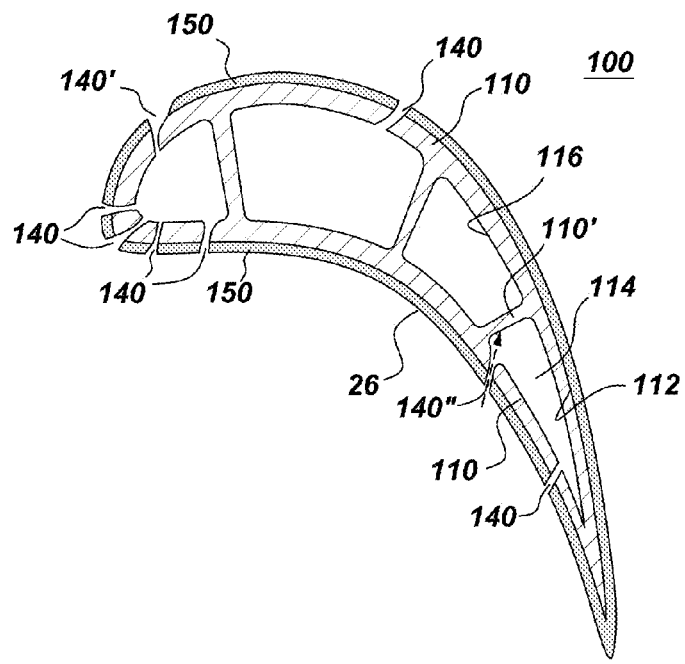

FIG. 7 schematically depicts, in perspective view, three exemplary micro-channels that extend partially along the surface of the substrate and convey coolant to the trailing edge of the airfoil; and FIG. 8 is a schematic cross-section of an exemplary airfoil configuration with exemplary cooling holes.

DETAILED DESCRIPTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the passage hole" may include one or more passage holes, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

Figure 1:
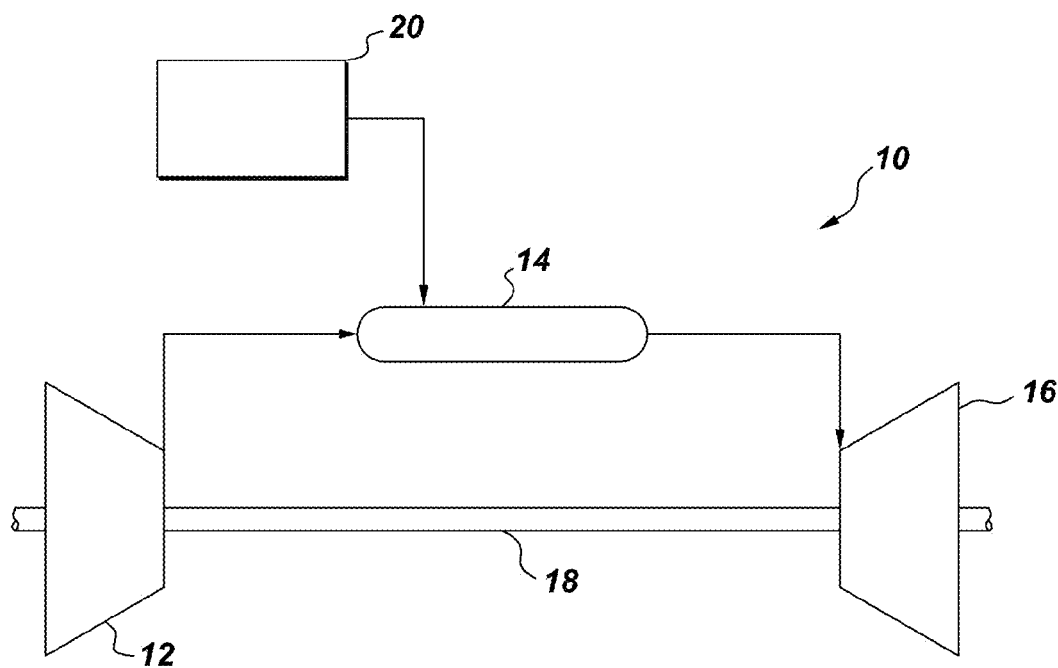
FIG. 1 is a schematic illustration of a gas turbine system.

FIG. 1 is a schematic diagram of a gas turbine system 10. The system 10 may include one or more compressors 12, combustors 14, turbines 16, and fuel nozzles 20. The compressor 12 and turbine 16 may be coupled by one or more shafts 18.

Figure 2:
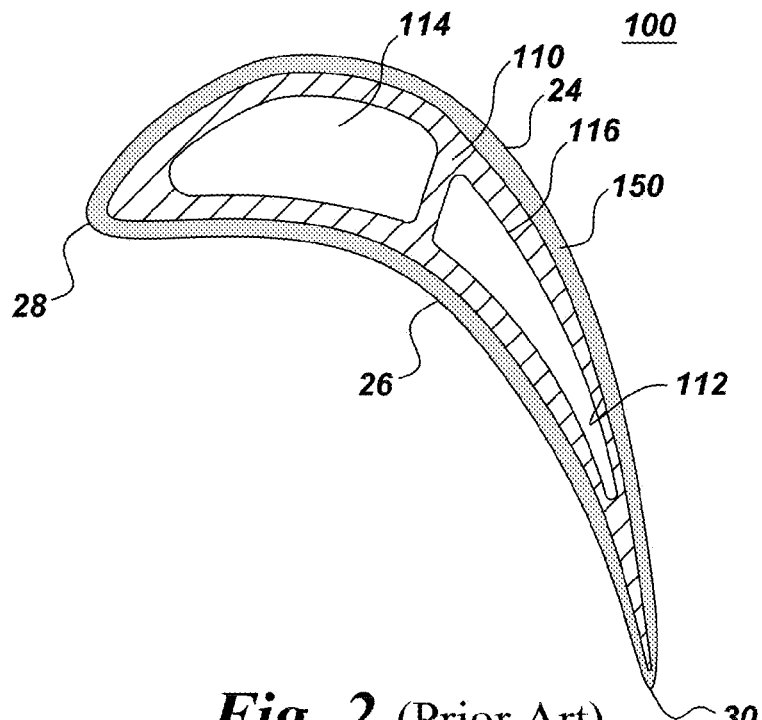
FIG. 2 is a schematic cross-section of an exemplary airfoil configuration.

The gas turbine system 10 may include a number of hot gas path components 100 (FIG. 2). A hot gas path component is any component of the system 10 that is at least partially exposed to a high temperature flow of gas through the system 10. For example, bucket assemblies (also known as blades or blade assemblies), nozzle assemblies (also known as vanes or vane assemblies), shroud assemblies, transition pieces, retaining rings, and turbine exhaust components are all hot gas path components. However, it should be understood that the hot gas path component 100 of the present invention is not limited to the above examples, but may be any component that is at least partially exposed to a flow of high temperature gas. Further, it should be understood that the hot gas path component 100 of the present disclosure is not limited to components in gas turbine systems 10, but may be any piece of machinery or component thereof that may be exposed to high temperature flows.

When a hot gas path component 100 is exposed to a hot gas flow, the hot gas path component 100 is heated by the hot gas flow and may reach a temperature at which the hot gas path component 100 is substantially degraded or fails. Thus, in order to allow system 10 to operate with hot gas flow at a high temperature, as required to achieve the desired efficiency, performance and/or life of the system 10, a cooling system for the hot gas path component 100 is needed.

Figure 3:
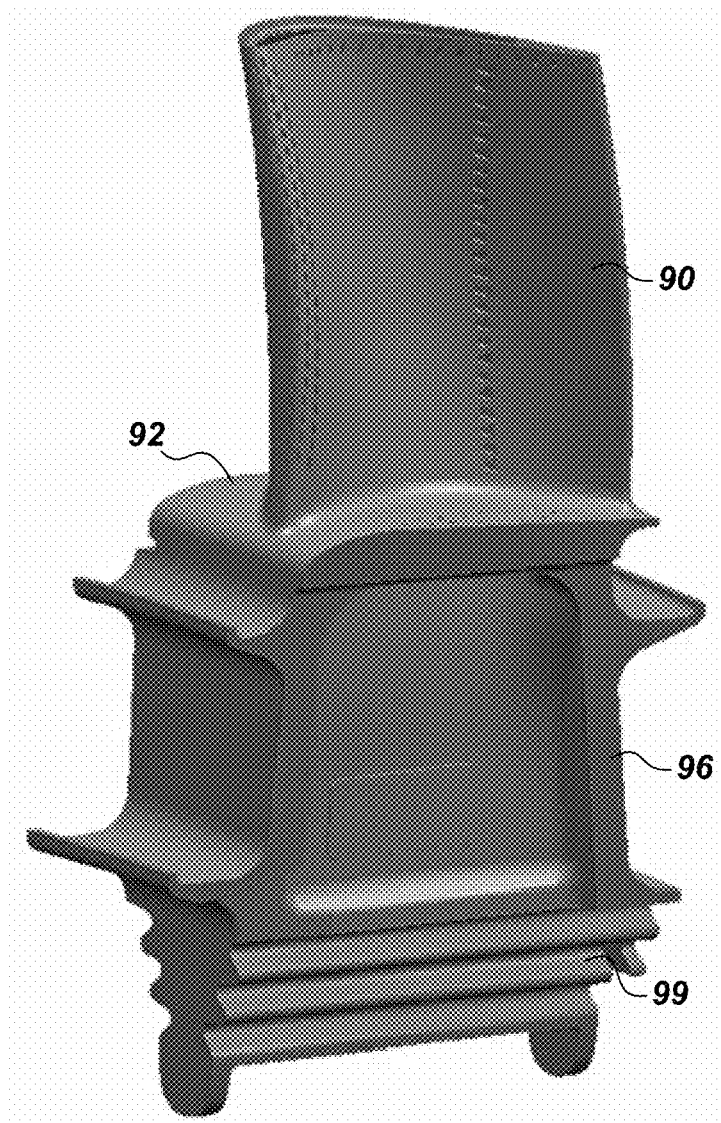
FIG. 3 shows an example hot gas path component with an airfoil, platform, shank, and dovetail.
Figure 4:
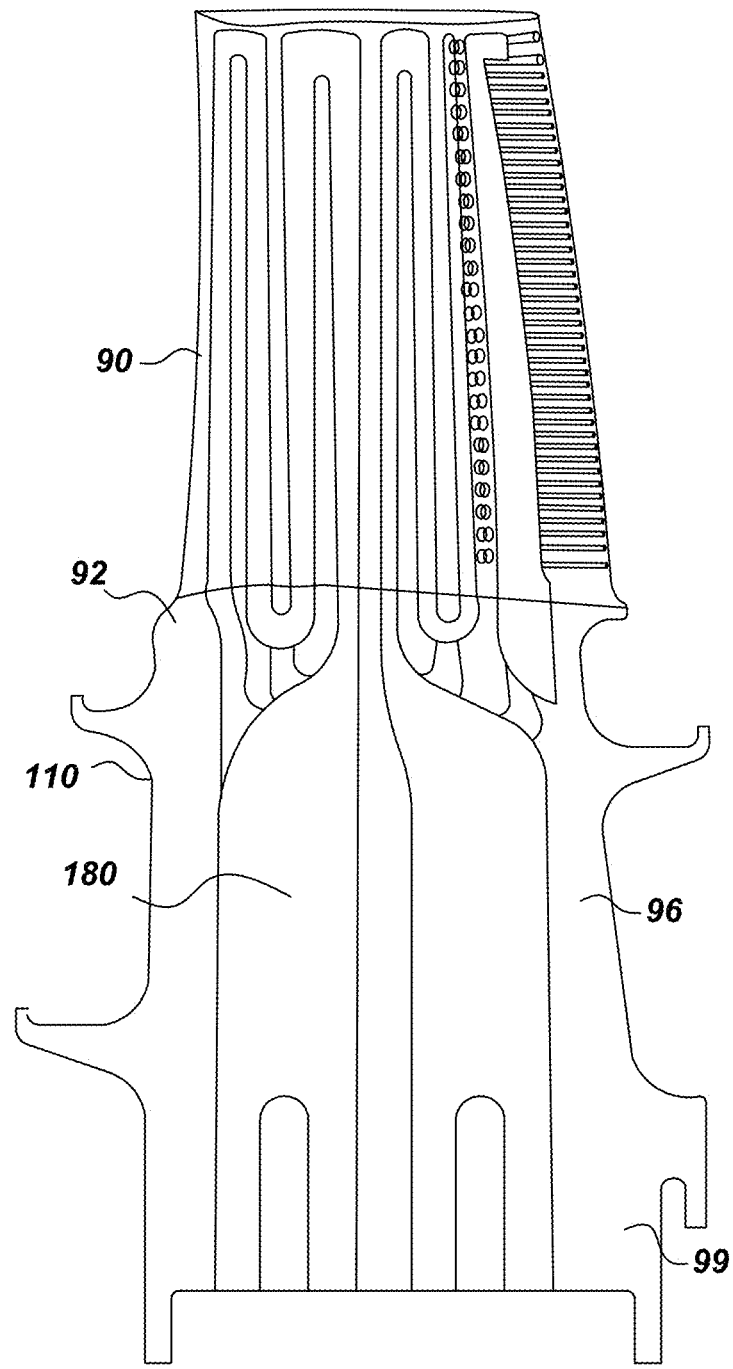
FIG. 4 is a cross-section of the hot gas path component of FIG. 3 showing the interior spaces within the component's substrate.

A method of machining a component 100 is described with reference to FIGS. 2-8. As indicated, for example, in FIG. 2, the component 100 includes a substrate 110 having an outer surface 112 and an inner surface 116. As indicated for example in FIG. 2, the inner surface 116 defines at least one interior space 114. For the example arrangement shown in FIG. 2, the outer surface 112 of the substrate 110 defines a pressure side wall 24 and a suction side wall 26, where the pressure and suction side walls 24, 26 are connected together at a leading edge 28 and at a trailing edge 30 of the component 100. As shown in FIG. 2, the suction side 26 is convex-shaped and pressure side 24 is concave-shaped. The component being machined will vary, but one example component is shown in FIG. 3. The example hot gas path component show in FIG. 3 has an airfoil 90, platform 92, shank 96, and dovetail 99. FIG. 4 is a cross-section of the hot gas path component of FIG. 3 showing the interior spaces within the component's substrate as including dispersed medium 180 in accordance with one embodiment of the present invention.

Figure 6:
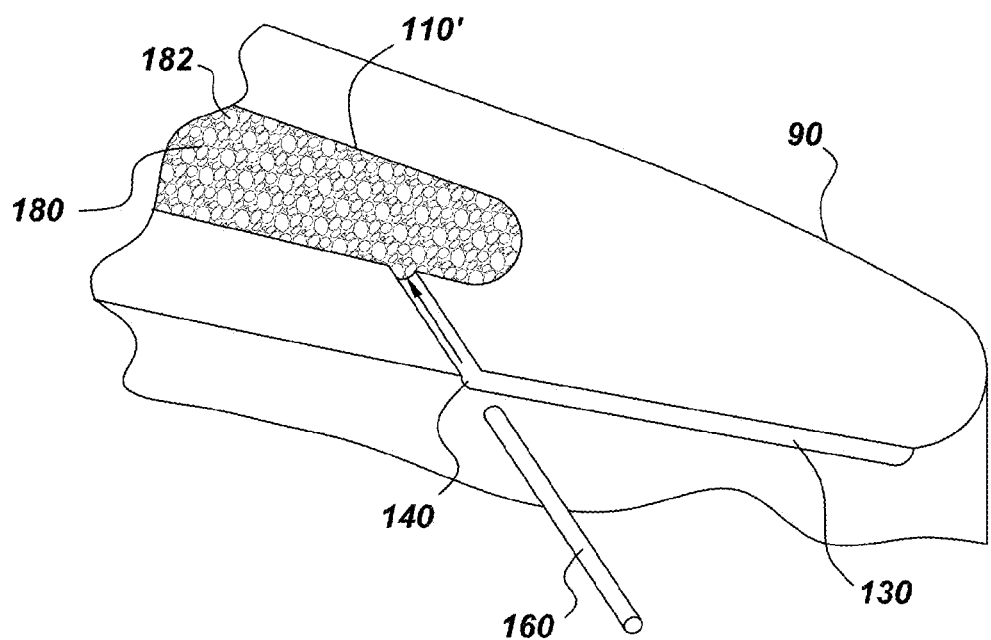
FIG. 6 illustrates the use of a distributed medium to prevent back-strike when forming hole(s) through a substrate to provide fluid connection with the interior space of the component.

Referring now to FIG. 6, the method includes disposing a distributed medium 180 comprising a number of irregularly shaped particles 182 in the interior space 114. As used herein, the term "irregularly shaped particles" means that the particles have more than one geometry. For example, the different geometries may result from formation of the particles by crushing. A number of different materials may be used. For example, the particles may comprise carbide, for example, crushed carbide particles or crushed tungsten carbide particles. As will be recognized by one skilled in the art, crushed carbide (or tungsten carbide) particles with have a number of different geometries, such that the crushed carbide (or tungsten carbide) particles are irregularly shaped. For particular embodiments, the irregularly shaped particles correspond to a mesh size in range of about 8 to about 40. More particularly, the irregularly shaped particles correspond to a mesh size in range of about 10 to about 30, and still more particularly, to a mesh size in range of about 12 to about 24. For particular embodiments, the effective size distribution for the irregularly shaped particles, based on a median dimension, is in a range of about 0.020 inches to about 0.050 inches.

For particular embodiments, the irregularly shaped particles have a compaction ratio of at least about sixty percent and, more particularly, the compaction ratio for the irregularly shaped particles is in a range of about sixty percent to about eighty percent. For example, crushed carbide with a compaction ratio of about seventy percent affords good backstrike mitigation. Referring still FIG. 6, for particular processes, the interior space 114 may be partially filled with the dispersed medium 180. However, for other processes, the interior space 114 may be completely filled with the dispersed medium 180.

Referring still to FIG. 6, the method further includes forming at least one hole 140 in the substrate 110, while the distributed medium 180 is disposed within the interior space 114, such that the distributed medium provides backstrike protection for an opposing wall 110' during the formation of the hole(s) 140. As indicated in FIG. 8, for example, each hole 140 extends through the substrate to provide fluid communication with the respective interior space 114. For the exemplary airfoil configuration shown in FIG. 8, the cooling holes 140 are film cooling holes. As discussed below, the film holes may have different footprints, and the cooling hole 140' shown in FIG. 8 is a shaped cooling hole with a diffuser. Many different types of holes may be formed in the component using this technique, as discussed below with reference to FIG. 8.

Depending on the specific configuration, a number of techniques may be used to form the hole(s) 140. Example techniques for forming the hole(s) 140 include abrasive liquid jet, plunge electrochemical machining (ECM), electric discharge machining (EDM) with a spinning electrode (milling EDM), electron beam drilling, and laser machining, for example, percussive (pulsed) laser machining. Example laser machining techniques are described in commonly assigned, U.S. patent application Ser. No. 12/697,005, "Process and system for forming shaped air holes" filed Jan. 29, 2010, which is incorporated by reference herein in its entirety. Example EDM techniques are described in commonly assigned U.S. patent application Ser. No. 12/790,675, "Articles which include chevron film cooling holes, and related processes," filed May 28, 2010, which is incorporated by reference herein in its entirety.

Example ALJ drilling processes and systems are disclosed in U.S. patent application Ser. No. 12/790,675, "Articles which include chevron film cooling holes, and related processes". As explained in U.S. patent application Ser. No. 12/790,675, the abrasive liquid jet process typically utilizes a high-velocity stream of abrasive particles (e.g., abrasive "grit"), suspended in a stream of high pressure liquid, for example water. The pressure of the liquid may vary considerably, but is often in the range of about 35-620 MPa. A number of abrasive materials can be used, such as garnet, aluminum oxide, silicon carbide, and glass beads. It should be noted that the abrasive liquid jet is not 100% formed of liquid and abrasive particles, but has a large amount of air as well. In fact by volume, air is the largest constituent in a conventional abrasive water jet. Beneficially, the capability of abrasive liquid jet machining techniques facilitates the removal of material in stages to varying depths and with control over the shape of the machined features. For example, this allows the hole(s) 140 (described above with reference to FIGS. 6, 7 and 9) to be drilled either as a straight hole of constant cross section, a shaped hole (e.g., elliptical), or a converging or diverging hole (not shown).

In addition, and as explained in U.S. patent application Ser. No. 12/790,675, the abrasive liquid jet system may include a multi-axis computer numerically controlled (CNC) unit (not shown). The CNC systems themselves are known in the art, and described, for example, in US Patent Publication 2005/0013926 (S. Rutkowski et al), which is incorporated herein by reference in its entirety. CNC systems allow movement of the cutting tool along a number of X, Y, and Z axes, as well as the tilt axes.

Figure 5:
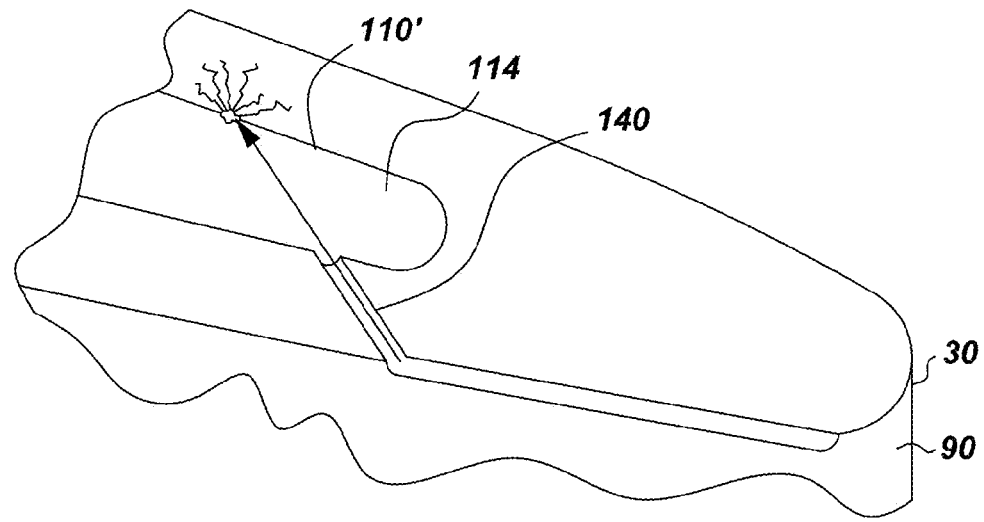
FIG. 5 illustrates a problem associated with forming holes to provide fluid connection with the interior space of the component.

FIG. 5 illustrates a problem associated with forming holes using ALJ. Namely, when ALJ drilling is used to drill holes 140 into the interior cavities 114, once the ALJ punches through the wall, the ALJ can also strike the interior surface of the opposite wall, thereby damaging that surface. Similar damage can occur with laser drilling. Beneficially, the use of a distributed medium when forming the hole(s) prevents back-strike, as illustrated in FIG. 6. The distributed medium serves as a backstop material to absorb and disperse the energy of the ALJ after it has penetrated the first wall.

For the exemplary airfoil configuration shown in FIG. 7, each hole 140 is a supply hole 140 for a cooling channel 130 that extends at least partially along the outer surface 112 of the substrate 110. For the exemplary airfoil configuration shown in FIG. 8, the holes 140 are film holes 140. The film holes may have different shapes. For example, the hole 140' in FIG. 8 is a shaped film hole with a diffuser. It should be noted that the above described-technique may be used to provide backstrike protection when forming a variety of holes, in addition to the film holes described above with reference to FIG. 8. For example, the holes may comprise one or more of passive cooling holes, blade tip dust holes, purge holes, airfoil trailing edge holes, film slots, sealing holes, sealing slots, endwall/platform/shroud/tip-shroud perimeter holes, and combinations thereof. In particular, backstrike protection may be particularly critical near the trailing edge (TE) of the airfoil because the distance between the opposing walls of the substrate may be too short to defocus the ALJ such that the opposing wall may be damaged in the absence of backstrike protection, so backstrike protection can be critical in the vicinity of the TE. Similarly, for sharply angled holes (see 140" in FIG. 8), the ALJ may strike and damage an opposing wall (110' in FIG. 8) in the absence of backstrike protection, so backstrike protection can be critical in the vicinity of sharply angled holes (such as 140" in FIG. 8).

Typically, the substrate 110 is cast prior to forming the hole(s). As discussed in U.S. Pat. No. 5,626,462, Melvin R. Jackson et al., "Double-wall airfoil," which is incorporated herein in its entirety, substrate 110 may be formed from any suitable material. Depending on the intended application for component 100, this could include Ni-base, Co-base and Fe-base superalloys. The Ni-base superalloys may be those containing both $\gamma$ and $\gamma'$ phases, particularly those Ni-base superalloys containing both $\gamma$ and $\gamma'$ phases wherein the $\gamma'$ phase occupies at least 40% by volume of the superalloy. Such alloys are known to be advantageous because of a combination of desirable properties including high temperature strength and high temperature creep resistance. The substrate material may also comprise a NiAl intermetallic alloy, as these alloys are also known to possess a combination of superior properties including high-temperature strength and high temperature creep resistance that are advantageous for use in turbine engine applications used for aircraft. In the case of Nb-base alloys, coated Nb-base alloys having superior oxidation resistance will be preferred, particularly those alloys comprising Nb-(27-40)Ti-(4.5-10.5)Al-(4.5-7.9)Cr-(1.5-5.5)Hf-(0-6)V, where the composition ranges are in atom percent. The substrate material may also comprise a Nb-base alloy that contains at least one secondary phase, such as a Nb-containing intermetallic compound comprising a silicide, carbide or boride. Such alloys are composites of a ductile phase (i.e., the Nb-base alloy) and a strengthening phase (i.e., a Nb-containing intermetallic compound). For other arrangements, the substrate material comprises a molybdenum based alloy, such as alloys based on molybdenum (solid solution) with $Mo_5SiB_2$ and/or $Mo_3Si$ second phases. For other configurations the substrate material comprises a TiAl-based intermetallic compound.

Referring now to FIGS. 6 and 7, the method further includes removing the distributed medium 180 from the interior space 114 after the hole(s) 140 is (are) formed. Different techniques for removing the distributed medium 180 may be employed, as described below. For particular processes, the step of removing the distributed medium 180 from the interior space 114 comprises performing at least one of flushing the interior space 114 with a liquid, for example flushing the interior space with water, and vibrating the substrate 110. For more particular processes, the irregularly shaped particles are removed using both flushing and vibration. In addition, a chemical stripping process may be performed to remove any residual particles.

For particular embodiments, the distributed medium 180 further comprises a binder, such that the irregularly shaped particles are distributed in the binder. For example, the binder may comprise an epoxy, non-limiting examples of which include Flexbar Facsimile®-206 compound or Duralco™ 4540. For particular processes, the step of removing the distributed medium 180 from the interior space 114 comprises burning off the epoxy.

Referring now to FIGS. 2 and 8, the method may optionally further include disposing a coating 150 over at least a portion of the outer surface 112 of the substrate 110. For the configuration shown in FIG. 8, the coating 150 is disposed prior to the step of forming the hole(s) 140, such that each hole 140 extends through the coating 150.

For particular configurations, the coating 150 has a thickness in the range of 0.1-2.0 millimeters, and more particularly, in the range of 0.2 to 1 millimeters, and still more particularly 0.2 to 0.5 millimeters for industrial components. For aviation components, this range is typically 0.1 to 0.25 millimeters. However, other thicknesses may be utilized depending on the requirements for a particular component 100.

The coating 150 may include structural coating layers and/or additional coating layer(s). Generally, the structural coating composition will be dictated by the composition of the underlying substrate. The coating layer(s) may be deposited using a variety of techniques. For particular processes, structural coating layer(s) may be deposited by performing ion plasma deposition (also known in the art as cathodic arc deposition).

For other process configurations, a structural coating may be deposited by performing at least one of a thermal spray process and a cold spray process. For example, the thermal spray process may comprise combustion spraying or plasma spraying, the combustion spraying may comprise high velocity oxygen fuel spraying (HVOF) or high velocity air fuel spraying (HVAF), and the plasma spraying may comprise atmospheric (such as air or inert gas) plasma spray, or low pressure plasma spray (LPPS, which is also known as vacuum plasma spray or VPS). In one non-limiting example, a (Ni, Co)CrAlY coating is deposited by HVOF or HVAF. Other example techniques for depositing the structural coating include, without limitation, sputtering, electron beam physical vapor deposition, entrapment plating, and electroplating.

For certain configurations, it is desirable to employ multiple deposition techniques for depositing structural and/or additional coating layers. For example, a first structural coating layer may be deposited using an ion plasma deposition, and a subsequently deposited layer and optional additional layers (not shown) may be deposited using other techniques, such as a combustion spray process or a plasma spray process. Depending on the materials used, the use of different deposition techniques for the coating layers may provide benefits in properties, such as, but not restricted to strain tolerance, strength, adhesion, and/or ductility.

As noted above, for certain processes, the coating 150 is disposed prior to the step of forming the hole(s) 140, such that each hole 140 extends through the coating 150. See for example, FIG. 8. However, for other processes, the method may include disposing a coating 150 over at least a portion of the outer surface 112 of the substrate 110 after the step of forming the hole(s) 140 has been performed. For particular embodiments, the coating 150 does not completely cover the hole(s) 140. This can be achieved in several ways. The hole (or a portion thereof, for example the exit region) may be machined to a larger diameter than intended in the final product, and the coating may then be allowed to "coat down" inside the hole thereby reducing the diameter to the desired value. For specific processes, only the exit region of the hole would be over-sized, since the coatings do not deposit all the way inside the entire hole. For other processes, a material can be deposited inside the hole to prevent coat down, then this material would be removed, for example by heating, after the coatings have been applied. However, for other arrangements, the coating 150 may cover the hole(s) 140.

Referring now to FIGS. 2-8, for particular process configurations, a method of machining a component 100 includes the steps of disposing a distributed medium 180 comprising irregularly shaped particles 182 in the interior space 114, where the irregularly shaped particles have a compaction ratio in a range of about sixty percent to about eighty percent. As indicated in FIG. 6, for example, the machining method further includes using an abrasive liquid jet 160 to form at least one hole 140 in the substrate 110, while the distributed medium 180 is disposed within the interior space 114, such that the distributed medium provides backstrike protection for an opposing wall 110' during the formation of the hole(s) 140. As indicated in FIGS. 6-8, for example, each hole 140 extends through the component substrate 110 to provide fluid communication with the respective interior space 114. As indicated in FIGS. 6 and 8, for example, the machining method further includes removing the distributed medium 180 from the interior space 114. For more particular configurations, the irregularly shaped particles correspond to a mesh size in range of about 10 to about 30, where an effective size distribution for the irregularly shaped particles, based on a median dimension, is in a range of about 0.020 inches to about 0.050 inches.

The above-described techniques are particularly advantageous when machining holes after the coating has been deposited. Because ceramic coatings may not be suitable candidates for machining techniques, such as EDM, laser drilling and/or ALJ machining may be used to form these holes, such that back-strike would become an issue, without the use of the above-described techniques. In addition, back-strike for ALJ may be more of an issue near the trailing edge of the component because there may not be enough distance between the opposing walls to defocus the liquid jet before it strikes an opposing wall. Back-strike may also be an issue when forming sharply angled holes, such as 140" in FIG. 8, absent the use of the above-described techniques Beneficially, in the above described processes, the distributed medium acts to absorb and disperse the abrasive liquid jet (ALJ) energy to prevent damage to the opposing interior wall. Thus, these processes have several advantages. First, the distributed medium is made of irregularly shaped particles that can spread the ALJ energy. The distributed medium may be introduced into narrow passages to facilitate protecting the opposing wall in these areas. Depending on the specific materials selected, the distributed medium may be ready disposed within internal cavities prior to ALJ and may be easily removed from the cavities after the ALJ. Irregularly shaped particles may be particularly beneficial for use in cavities with tight, spacial constraints.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of machining a component comprising a substrate having an outer surface and an inner surface, wherein the inner surface defines at least one interior space, the method comprising:

disposing a distributed medium comprising a plurality of irregularly shaped particles in the interior space;

forming at least one hole in the substrate using an abrasive liquid jet, while the distributed medium is disposed within the interior space, such that the distributed medium provides backstrike protection for an opposing wall during the formation of the at least one hole, wherein the hole extends through the substrate to provide fluid communication with the respective interior space; and removing the distributed medium from the interior space.

2. The method of claim 1, further comprising disposing a coating over at least a portion of the outer surface of the substrate, wherein the coating is disposed prior to the step of forming the at least one hole, such that the hole extends through the coating.

3. The method of claim 1, further comprising disposing a coating over at least a portion of the outer surface of the substrate after the step of forming the at least one hole has been performed.

4. The method of claim 1, wherein the irregularly shaped particles comprise carbide.

5. The method of claim 1, wherein the irregularly shaped particles correspond to a mesh size in range of about 8 to about 40.

6. The method of claim 1, wherein the irregularly shaped particles correspond to a mesh size in range of about 10 to about 30.

7. The method of claim 1, wherein the irregularly shaped particles correspond to a mesh size in range of about 12 to about 24.

8. The method of claim 1, wherein the step of removing the distributed medium from the interior space comprises performing at least one of:
flushing the interior space with a liquid; and
vibrating the substrate.

9. The method of claim 1, wherein the distributed medium further comprises a binder, such that the irregularly shaped particles are distributed in the binder.

10. The method of claim 9, wherein the step of removing the distributed medium from the interior space comprises burning off the binder.

11. The method of claim 1, wherein the irregularly shaped particles have a compaction ratio of at least about sixty percent.

12. The method of claim 1, wherein the compaction ratio for the irregularly shaped particles is in a range of about sixty percent to about eighty percent.

13. The method of claim 1, wherein the hole comprises a film hole.

14. The method of claim 1, wherein the hole is a supply hole for a cooling channel that extends at least partially along the outer surface of the substrate.

15. The method of claim 1, wherein the interior space is partially filled with the dispersed medium.

16. The method of claim 1, wherein the interior space is completely filled with the dispersed medium.

17. The method of claim 1, wherein an effective size distribution for the particles, based on a median dimension, is in a range of about 0.020 inches to about 0.050 inches.

18. A method of machining a component comprising a substrate having an outer surface and an inner surface, wherein the inner surface defines at least one interior space, the method comprising:
disposing a distributed medium comprising a plurality of irregularly shaped particles in the interior space, wherein the irregularly shaped particles have a compaction ratio in a range of about sixty percent to about eighty percent;
using an abrasive liquid jet to form at least one hole in the substrate, while the distributed medium is disposed within the interior space, such that the distributed medium provides backstrike protection for an opposing wall during the formation of the at least one hole, wherein the hole extends through the substrate to provide fluid communication with the respective interior space; and
removing the distributed medium from the interior space.

19. The method of claim 1, wherein the irregularly shaped particles correspond to a mesh size in range of about 10 to about 30, and wherein an effective size distribution for the particles, based on a median dimension, is in a range of about 0.020 inches to about 0.050 inches.

* * * * *